United States Patent [19]  
Cotter

[11] 3,893,111  
[45] July 1, 1975

[54] SYSTEM AND METHOD FOR REMOTE MONITORING OF ANIMAL TEMPERATURE

[75] Inventor: John L. Cotter, Laconner, Wash.

[73] Assignee: Albert F. Albert, Santa Barbara, Calif.

[22] Filed: Mar. 14, 1974

[21] Appl. No.: 451,009

[52] U.S. Cl. ............... 343/6.5 R; 128/2 H; 128/2 P; 128/2.1 A; 343/718
[51] Int. Cl. ....... A61b 5/00; G01s 9/56; H01q 1/12
[58] Field of Search ........... 343/6.5 R, 6.5 LC, 718; 128/2.1 A, 2 H, 2 P

[56] References Cited
UNITED STATES PATENTS

| | | | |
|---|---|---|---|
| 2,142,117 | 1/1939 | Dow | 343/700 |
| 2,278,601 | 4/1942 | Werndl | 343/700 X |
| 3,229,684 | 1/1966 | Nagumo et al. | 343/6.5 R X |
| 3,253,588 | 5/1966 | Vuilleumier et al. | 343/6.5 R X |
| 3,308,667 | 3/1967 | Pearlman | 128/2 H X |
| 3,453,546 | 7/1969 | Fryer | 128/2.1 A |
| 3,576,554 | 4/1971 | Temps, Jr. et al. | 128/2.1 A X |

OTHER PUBLICATIONS

"The Radio Pill" by E. N. Rowlands et al., British Communications and Electronics, Aug. 1960, pp. 598–601.

Primary Examiner—Malcolm F. Hubler

[57] ABSTRACT

System for remotely monitoring the temperature of animals in which a capsule containing a variable length antenna which changes in length according to the animal's temperature is embedded in the animal. Interrogating means are provided for transmitting a range of frequency signals to the capsule and for receiving reflected signals from the antenna. The system in addition has means for detecting a peak signal value from the antenna to indicate the animal's temperature and to provide a read-out or display of the animal's temperature.

6 Claims, 2 Drawing Figures

SYSTEM AND METHOD FOR REMOTE MONITORING OF ANIMAL TEMPERATURE

BACKGROUND OF INVENTION

This invention relates to a system for remotely monitoring the temperature of animals including the whole range of consumable livestock such as beef, sheep and pork.

As feed lot operators, cattle raisers and dairymen are aware there is presently no quick, economical system for diagnosing the sickness of an animal. Obviously, the starting point in any diagnosis of animal illness is the animal's temperature. An animal's temperature reacts much like human temperature in that it correlates to the degree or extent of the illness. Presently, the most practical way of checking an animal's temperature is by rectal thermometer. Since it is not feasible to check every animal in this way, isolating an ill animal begins with its visual appearance of illness. In other words, the owner or operator must determine from a strictly visual examination whether or not a particular animal should be checked by thermometer for its temperature. Additionally, female animals will experience a minor amount of temperature rise during the ovulation cycle. A system for quick, remote reading of the body temperature of females will enable the operator or owner to separate her from the herd for artificial insemination. Thus the operator will know when to bring a cow in, for example, for impregnation.

Attempts have been made to provide a practical system for remote monitoring with an implanted device. These, however, have usually been complex and included their own power pack. As such and as so designed they are too impractical and too expensive if for no other reason than that a power pack must be renewed or replaced periodically. Thus, it is not feasible for the feed lot operator, cattlement or stockmen to put one in every animal. Besides body implants, attempts have also been made to feed devices to an animal orally, such as a cow, so that it would lodge in the forestomach. Again, complexity, expense and self-contained power packs made them impractical. Aside from animals, coded signals have been used to identify airplanes and railroad rolling stock but none of the systems as known is similar to the present invention.

SUMMARY OF INVENTION

The system of this invention contemplates an encapsulated variable length antenna which is embedded or implanted subcutaneously as in the shoulder or hindquarter of an animal. The length of the antenna is designed to change in accordance with the animal's body temperature. The antenna contained within the capsule reflects signals from a transmitting device which will emit a series of interrogating frequencies corresponding for instance to 95°F through perhaps as high as 108° or 110°F. The antenna will reflect a peak amplitude singal from the range of frequencies. The peak amplitude signal will result from the antenna's ¼ or ½ wave resonating frequency. In short, the transmitter sends out a series of signals to find the length of the antenna. The maximum voltage reflected signal is picked up by a receiver and through a series of steps the signal is decoded and delivered to a read-out or display component.

Accordingly, it is among the many features, advantages and objects of this invention to provide a uniquely simple system for remotely and instantaneously monitoring the body temperature of animals and livestock. The antenna is constructed to respond to the animal's body temperature as with a common thermometer except that it will also be designed to reflect a signal. The system is not only simple but inexpensive. It will enable rapid monitoring of large herds of animals merely by running them through chutes. Every animal in the herd provided with an encapsulated antenna subcutaneously implanted can be monitored. The system can be constructed either as a hand held device and operated on demand or could be set up as mentioned above in a chute in conjunction with a photo cell arrangement which would cause it to be operated automatically as an animal walks through the chute. Digital limits could be set so that if an animal's temperature either exceeded or was lower than a preset interrogation range the unit could then mark the animal with something like a water soluble dye. The animal could later be picked out of the herd by visual inspection. The cost of implanting an antenna capsule in each animal would be economically feasible and the speed of the system would be such that each animal could be checked as it moved through a chute without having to slow down the number of animals moving past the interrogator unit. The system is accurate and reliable and could be afforded by every herd owner or feed lot operator.

DESCRIPTION OF PREFERRED EMBODIMENT

The system herein is based on the principal that, as an antenna changes length, the resonating frequency to which it responds will also change. Antennas are customarily made in full, half or quarter wave length configurations. Each length is respectively called a full wave resonating, a half wave resonating or a quarter wave resonating antenna. Due to the short length requirements of antennas which are implanted subcutaneously in an animal the discussion here will presume half or quarter length frequencies. As an example, if a conventional mercury thermometer receives a radio signal at a frequency corresponding to its quarter or half wave length resonating point the reflected signal received back from the antenna would permit one to know the length of the mercury column in the thermometer. With the column length calibrated to temperatures it is thereby possible to know the temperature of the animal.

Figure 2:
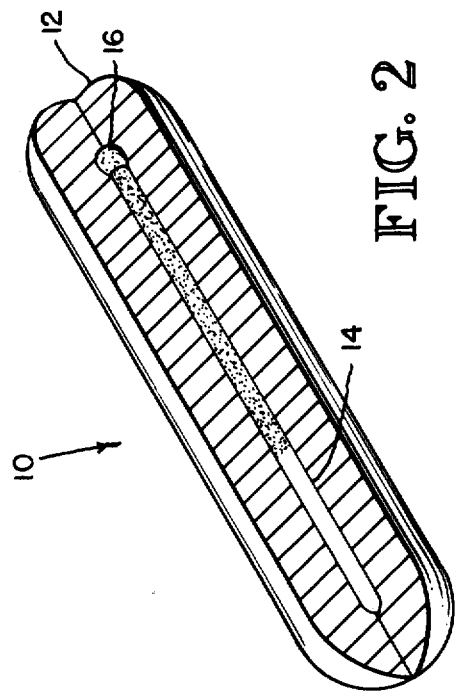
FIG. 2 is a perspective view with a portion of the capsule cut away to show details of the miniaturized antenna within the capsule.

The encapsulated antenna of FIG. 2 is essentially a thermometer. The capsule, generally designated by the number 10, comprises a non-metallic body 12, with a capillary tube 14 having a reservoir 16. Within the capillary tube and reservoir is a metallic fluid such as mercury or a metallic powder in suspension in water or alcohol. The capsule functions in the manner of a thermometer in that the metallic fluid in the reservoir, expanding and contract due to temperature changes, amplifies the expansion and contraction in the capillary tube to change the length of the metallic fluid column. It is also contemplated that the antenna could be printed metal on a non-metallic substrate the length of which would also respond to the animal's body temperature. Capsule 10 is then embedded subcutaneously in the animal in a non-sensitive region such as in the hindquarters or shoulder but, in any event, in a location which will preferrably be directly in line with the interrogating portion of the system.

Figure 1:
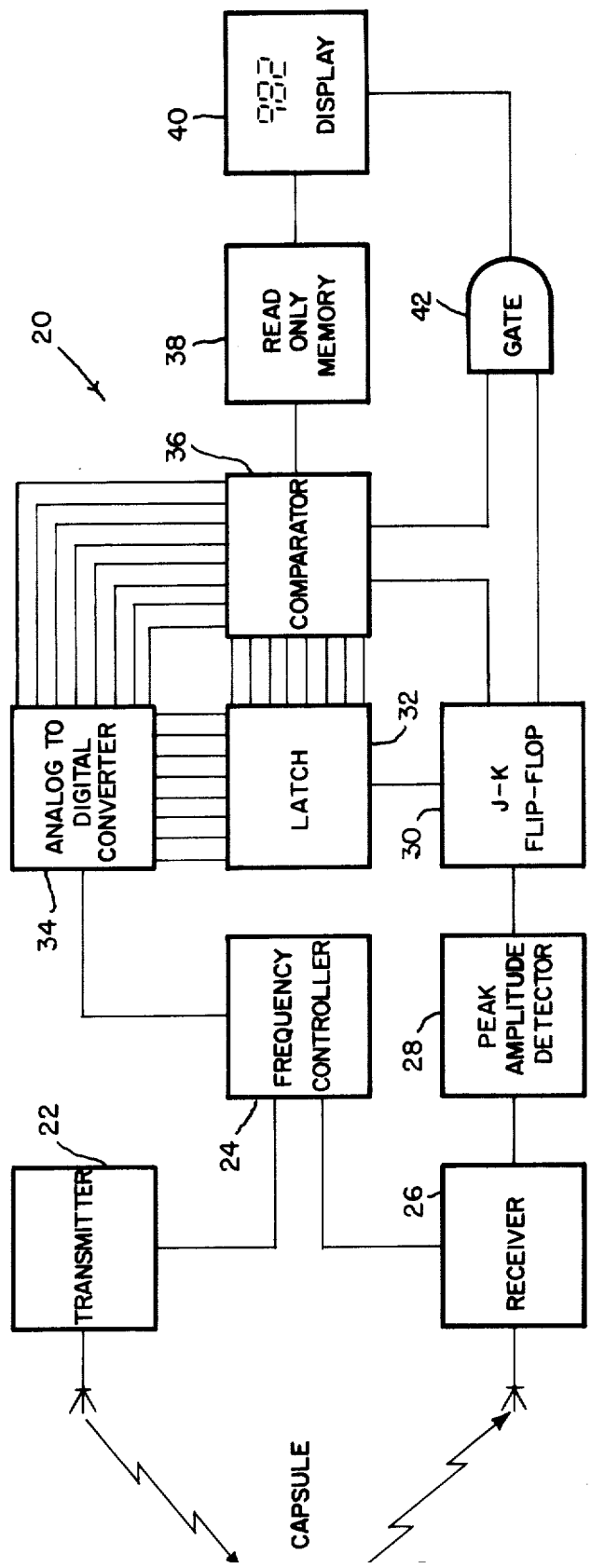
FIG. 1 is a block diagram presentation of the system showing the primary components which make an operable monitoring unit.

Referring now to FIG. 1 and the system block diagram, it will be seen that the interrogating unit generally designated by the number 20 consists of a transmitter 22 designed to tranmit the signals in gigahertz frequencies. It will be apparent to those skilled in the art that these very high frequency transmission signals are necessary because of the necessarily short length of the encapsulated variable length antenna. A frequency controller 24 is connected to the transmitter and also to receiver 26 and controls the frequency at which transmitter 22 transmits as well as the frequency of receiver 26. The frequency controller sweeps the transmitter and receiver through the desired frequency range corresponding to the probable length of the antenna in capsule 10. For purposes of illustration the lower and upper limits of the frequency ranges will be set to correspond to a temperature range of approximately 90° to 110°F though the range may obviously vary. Transmitter 22 will sweep through its frequency range starting at the lower limit and go to the upper limit, and the receiver will read the reflected signals from the antenna in capsule 10.

A peak amplitude detector 28 picks up the reflected peak amplitude signal and outputs a signal to the flip flop which also in turn puts out a signal to latch 32 to hold the 8 bit binary signal from the analog-to-digital converter 34. It should be mentioned that frequency controller 24 outputs an analog voltage to converter 34 which corresponds to the frequency being transmitted and received. Converter 34 in turn outputs an 8 bit binary signal to latch 32 and comparator 36. Thus when the peak amplitude detector 28 signals flip flop 30 it in turn signals latch 32 to hold the 8 bit binary signal from converter 34. When the transmitter sweeps up range a peak signal is placed in latch 32 but not comparator 36. The interrogating unit 20 then sweeps down range to reinterrogate capsule 20 and a signal from the flip flop tells comparator 36 to compare the 8 bit binary output on the sweep down with the 8 bit binary signal that has been set into the latch. If the signals compare, the 8 bit binary output from the converter 34 is fed to read only memory 38 which converts the 8 bit binary signal to a usable binary code decimal output for display 40. The output display will correspond in digital numbers to the animal's temperature. A signal from comparator 36 to flip flop 30 indicating that the comparison is true enables the gate 42 to be triggered which in turn allows the display to be made by the output 40.

It will be appreciated that display 40 could be an analog read out attached to a meter as well as the digital display suggested by the drawing. It is to be noted that while antenna 10 is shown encapsulated in a non-metallic substance such as teflon, it is also possible that a nontoxic metal with a high coefficient of expansion by itself may also suffice without encapsulation on being embedded in a substrate. The interrogation steps by unit 20 could be in frequency differentials corresponding to whole or partial degrees as determined most practical. The system may be used on a group of animals and if there is a signal indicating a high temperature that group of animals could then be individually screened in order to isolate the sick one.

What is claimed is:

1. A remote monitoring system for animal body temperature, comprising:
   a. a variable length antenna means for being subcutaneously implanted in an animal, said antenna means being such that its length variations are proportional to changes in the animal's body temperature,
   b. a remote interrogating unit which transmits a range of radio frequency signals bracketing the range through which the length of said antenna may vary, said range of signals including one which will constitute a resonating frequency corresponding to the antenna length and to which the antenna will respond and transmit back to the interrogating unit a peak amplitude reflected signal, said unit including additional means for receiving said peak amplitude signal and converting the same to a visual read out of the animal's body temperature.

2. The system according to claim 1 and wherein said interrogating unit includes a transmitter and receiver both of which are connected to and controlled by a frequency controller.

3. The system according to claim 1 and wherein said antenna means comprises a reservoir and capillary tube containing metallic powder in suspension in a carrier liquid and wherein the antenna is contained in a non-metallic capsule.

4. The system according to claim 1 and wherein said antenna means is a solid metal with a high coefficient of expansion.

5. An antenna for a remote monitoring system for animal body temperature, comprising:
   a. a variable length antenna means for being subcutaneously implanted in an animal, said antenna means being such that its length variations are proportional to changes in the animal's body temperature, said antenna also being at least partially metallic in nature and encapsulated in a non-metallic substance.

6. A method for remote monitoring of the body temperature of animals, comprising:
   a. implanting subcutaneously a variable length antenna in an animal which variations in length are directly responsive to the animal's body temperature,
   b. transmitting a range of interrogating radio signals to said antenna to determine the length of said antenna,
   c. reflecting said signals from said antenna,
   d. receiving said signals in such a manner as to detect a peak amplitude reflected signal corresponding to a resonating frequency for the antenna length, and
   e. converting said peak amplitude reflected signal to a visual read out of the animal's body temperature.

* * * * *